United States Patent [19]

Freyer et al.

[11] Patent Number: 5,126,119
[45] Date of Patent: Jun. 30, 1992

[54] PROCESS FOR PRODUCING CHLORINE-FREE HYDROCHLORIC ACID LOW IN AOX

[75] Inventors: Walter Freyer, Leitershofen; Theo Olffers, Gersthofen, both of Fed. Rep. of Germany

[73] Assignee: Hoechst Aktiengesellschaft, Frankfurt am Main, Fed. Rep. of Germany

[21] Appl. No.: 680,772

[22] Filed: Apr. 1, 1991

Related U.S. Application Data

[63] Continuation of Ser. No. 412,405, Sep. 26, 1989, abandoned.

Foreign Application Priority Data

Sep. 28, 1988 [DE] Fed. Rep. of Germany ....... 3832804

[51] Int. Cl.$^5$ .............................................. C01B 7/07
[52] U.S. Cl. .................. 423/240 R; 423/241; 423/DIG. 20; 423/488
[58] Field of Search ................... 423/241, 488, 240

[56] References Cited

U.S. PATENT DOCUMENTS

| | | | |
|---|---|---|---|
| 3,980,758 | 9/1976 | Krumböck et al. | 423/481 |
| 4,010,017 | 3/1977 | Loyless | 423/240 |
| 4,195,596 | 4/1980 | Scheifley et al. | 423/241 |
| 4,215,095 | 7/1980 | Harris et al. | 423/488 |
| 4,224,293 | 9/1980 | Pieters et al. | 423/241 |
| 4,233,280 | 11/1980 | Langens et al. | 423/488 |
| 4,346,069 | 8/1982 | Riegel et al. | 423/488 |
| 4,464,351 | 8/1984 | Vasak et al. | 423/488 |

FOREIGN PATENT DOCUMENTS

| | | |
|---|---|---|
| 1228232 | 11/1966 | Fed. Rep. of Germany . |
| 2634959 | 2/1978 | Fed. Rep. of Germany . |
| 3611886 | 10/1987 | Fed. Rep. of Germany . |
| 1070514 | 6/1967 | United Kingdom . |
| 2040897 | 9/1980 | United Kingdom . |

*Primary Examiner*—John Niebling
*Assistant Examiner*—Brian M. Bolam

[57] ABSTRACT

A process for producing a chlorine-free hydrochloric acid low in AOX from crude gases containing hydrogen chloride and organic impurities has been found. The crude gases wer subjected to a thermal treatment at 800° to 1600° in a reducing atmosphere. The hydrochloric acid obtained after absorption of the hydrogen chloride is chlorine-free and contains virtually no organic impurities. The waste gas is also chlorine-free.

9 Claims, 3 Drawing Sheets

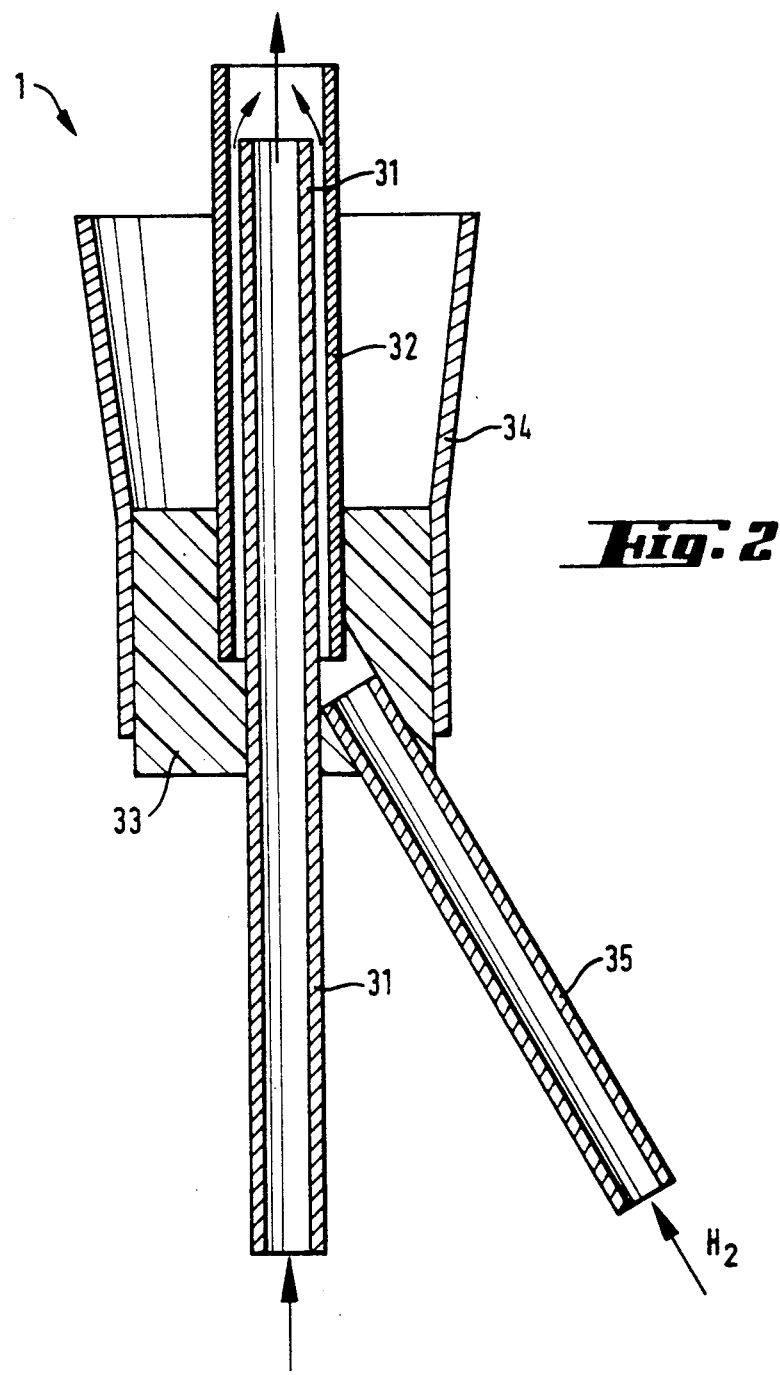

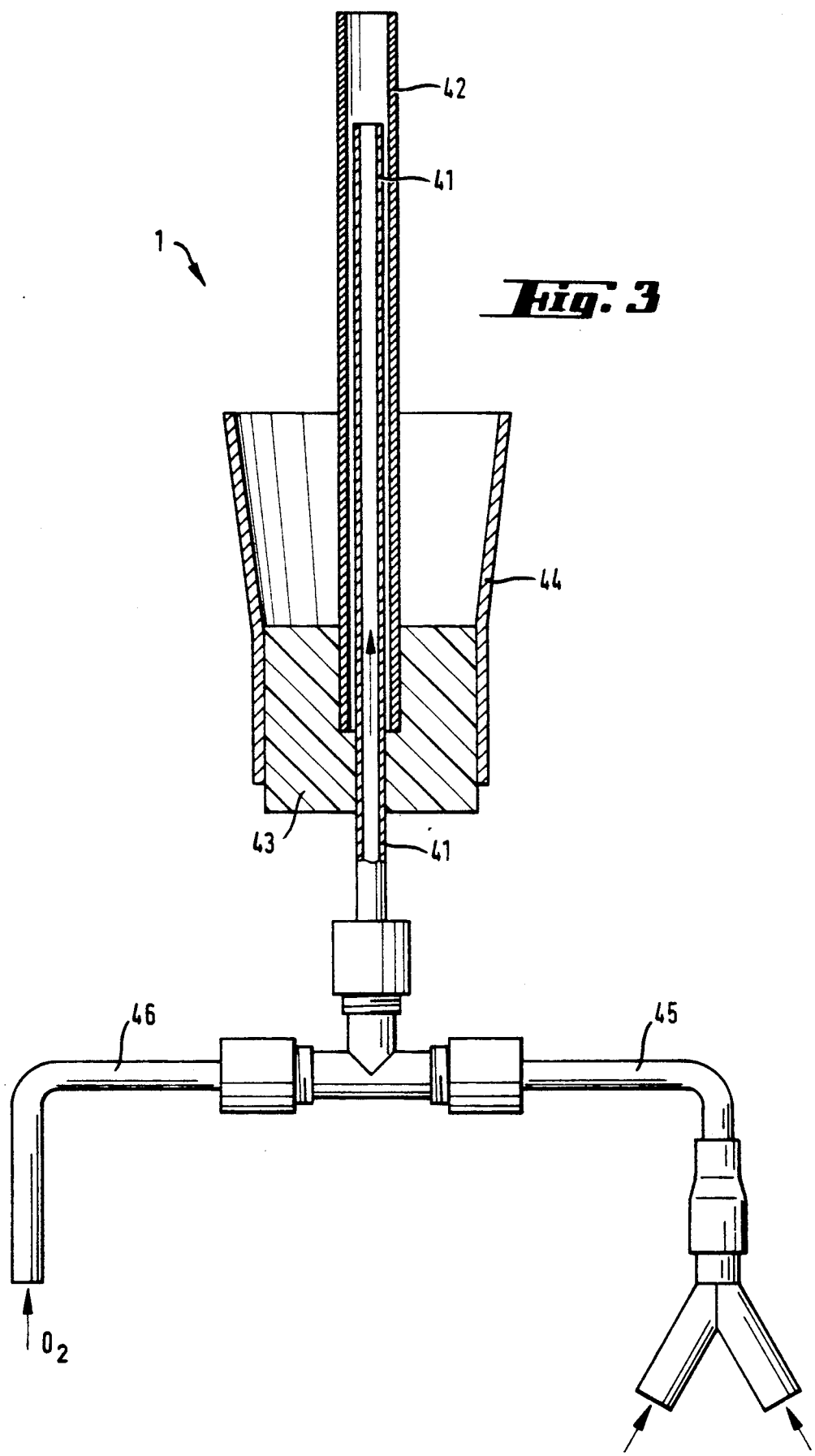

PROCESS FOR PRODUCING CHLORINE-FREE HYDROCHLORIC ACID LOW IN AOX

This is a continuation of our copending application Ser. No. 07/412,405, filed Sep. 26, 1989 now abandoned.

FIELD OF THE INVENTION

The invention relates to an improved process for producing chlorine-free hydrochloric acid low in AOX from crude gases containing hydrogen chloride and organic impurities.

DESCRIPTION OF THE RELATED ART

In the chlorination of organic compounds on an industrial scale, large quantities of hydrogen chloride are obtained, which is usually processed to give hydrochloric acid by absorption in water.

The reactions in which hydrogen chloride is formed as a by-product include, for example, the chlorination of carboxylic acids to give partially chlorinated or perchlorinated carboxylic acids, for example the chlorination of acetic acid to give monochloroacetic acid or trichloroacetic acid:

$$CH_3COOH + Cl_2 \rightarrow CH_2Cl-COOH + HCl$$

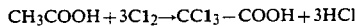
$$CH_3COOH + 3Cl_2 \rightarrow CCl_3-COOH + 3HCl$$

and also the reaction of paraffins with chlorine:

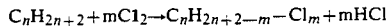
$$C_nH_{2n+2} + mCl_2 \rightarrow C_nH_{2n+2-m}-Cl_m + mHCl$$

This includes the industrially important chlorination of methane to give its various chlorine derivatives in the same way as the reaction of long-chain paraffins with chlorine to give chloroparaffins of varying degrees of substitution.

Likewise, HCl is liberated in the preparation of esters and acids from the acid chlorides:

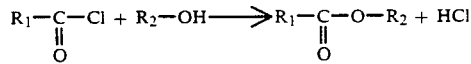

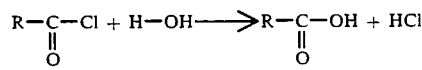

and in the nuclear chlorination and side chain chlorination of aromatics with the use of chlorine, for example in the preparation of chlorine derivatives of benzene and toluene:

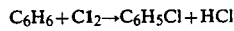
$$C_6H_6 + Cl_2 \rightarrow C_6H_5Cl + HCl$$

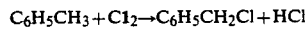
$$C_6H_5CH_3 + Cl_2 \rightarrow C_6H_5CH_2Cl + HCl$$

Since the reactions do not quantitatively follow the above equations, the main products, and in particular also the hydrogen chloride arising and consequently the hydrochloric acid obtained from the latter—are contaminated with by-products.

Part of the impurities remains in the waste gas after the absorption and must removed therefrom, before the waste gas can be discharged to the atmosphere. The hydrochloric acid produced must also be purified before it can be used for various purposes—inter alia in the food industry. The impurities which are found in the hydrochloric acid and in the waste gases are mainly chlorinated hydrocarbons. A measure of the degree of contamination is the content of organic halogen compounds which are adsorbable on activated carbon, the so-called AOX content. Since, in almost all chlorination reactions, the chlorine is not completely consumed, a greater or lesser residue of free chlorine is in most cases found in the hydrochloric acid obtained from the residual chlorination gases and in the waste gases.

The free chlorine is equally undesirable in the waste gas and in the hydrochloric acid as other impurities and must be removed for anti-pollution reasons and for improving the acid quality.

It is known that a hydrochloric acid lower in organic impurities and a waste gas, which is still contaminated only with traces of such compounds, are obtained if the residual chlorination gases are subjected to a thermal treatment before the absorption. This is carried out in such a way that the contaminated gases containing hydrogen chloride are heated in suitable combustion chambers to about 600° C.–1200° C., the energy being supplied in most cases by the combustion of natural gas or other fuels with an excess of oxygen, and the temperature depending on the type of impurity. In this way, flue gases are obtained which, although they have a lower content of organic substances, nevertheless still contain free chlorine.

The reason is that, in the presence of oxygen, the free chlorine originally present in the residual chlorination gas cannot react quantitatively to give HCl according to $2\ Cl_2 + 2\ H_2O \rightarrow 4\ HCl + O_2$, but free chlorine can even form additionally.

During the subsequent absorption of the hydrogen chloride, the free chlorine partially dissolves in the hydrochloric acid being formed and partially remains in the waste gas. Dechlorination of both the hydrochloric acid and the waste gas is possible only with a considerable process engineering effort. Thus, dechlorination of the hydrochloric acid, for example by blowing or stripping, proceeds only incompletely and involves a noticeable loss in hydrogen chloride concentration.

In addition, new waste gas streams which contain chlorine and hydrogen chloride and which in turn must be purified again, are formed. Like the dechlorination of the original waste gases, this can be accomplished in principle only by alkaline scrubbing, so that the waste air problem is displaced to the waste water side.

The process for removing hydrogen chloride and chlorine from combustion gases with the production of hydrochloric acid, which operates with multi-stage waste gas scrubbing, has already been described (cf. DE-A 3,611,886).

A process is also known which serves to reduce the free chlorine content of the flue gases from a combustion installation (cf. GB-A 2,040,897). In this case, hydrogen is fed into the quench zone of the combustion apparatus, the hydrogen rate depending on the air rate fed to the combustion chamber. In this way, it was possible to reduce the chlorine content of a flue gas from originally 600 mg/m³ to 48 mg/m³. However, flue gases with chlorine contents of this order of magnitude still do not lead to chlorine-free hydrochloric acid and chlorine-free waste gases.

Finally, a process for destroying chlorinated hydrocarbon residues with the production of hydrochloric acid has also been disclosed (cf. GB-B 1,070,515). Although the free chlorine content in the flue gas is kept low in this case by minimizing the oxygen content and feeding steam and/or water into the combustion chamber, the production of hydrochloric acid without residual contents of elemental chlorine is apparently unsuccessful since free chlorine is sometimes still found in the residual gas after the HCl absorption.

SUMMARY OF THE INVENTION

It was then the object of the present invention to develop an easily operable process for producing chlorine-free hydrochloric acid low in AOX from residual chlorination gases, and the quality of the waste gases was also to be improved.

The invention thus relates to a process for producing chlorine-free hydrochloric acid of low AOX content by thermal treatment of crude gases containing hydrogen chloride and/or chlorine and/or organic compounds and subsequent absorption of the hydrogen chloride in water, which comprises carrying out the thermal treatment with the use of a hydrogen-containing fuel gas in such a way that the crude gases are heated to a temperature of 800° C. to 1600° C. by contacting with a supporting flame, the fuel gas feed and oxygen feed being controlled in such a way that no soot is formed in the combustion zone and excess hydrogen is present in the waste gas.

The crude gas, which is to be reprocessed by the process according to the invention, contains varying quantities of hydrogen chloride, chlorine, nitrogen, chlorinated hydrocarbons, hydrocarbons and other compounds. It is subjected to a thermal conversion by combining it with a sufficient quantity of a flammable hydrogen-containing gas and oxygen and burning it, it being possible in an industrial plant to feed the oxygen also in the form of air.

In addition to hydrogen, other flammable gases such as, for example, methane, ethane and propane are also suitable as the fuel gas. Even though the process can also be carried out with industrial gases such as, for example, liquefied gas, those fuels will advantageously be used in large-scale plants in which the carbon/hydrogen ratio is as low as possible.

The temperature in the combustion chamber is in the range from 800° to 1600° C., preferably between 1000° and 1400° C. Fuel gas and oxygen or air are added at such rates that the desired combustion chamber temperature is reached, no soot is formed in the combustion zone and the flue gas has a hydrogen content of about 1 to 15% by volume, preferably 2 to 5% by volume.

The rate of the fuel gas and of the oxygen or air depends on the rate and composition of the crude gases which are to be heated up. If the rate of the crude gases and their composition are subject to relatively wide fluctuations, automatic control of the fuel feed and oxygen or air feed can be of advantage—under certain circumstances with the use of a process computer.

The resulting flue gas contains virtually no chlorine compounds other than hydrogen chloride and no organic substances. It is freed of the hydrogen chloride by methods known per se.

BRIEF DESCRIPTION OF THE DRAWINGS

FIGS. 2 and 3 show preferred embodiments of burners suitable for the process according to the invention on a laboratory scale.

Figure 1:
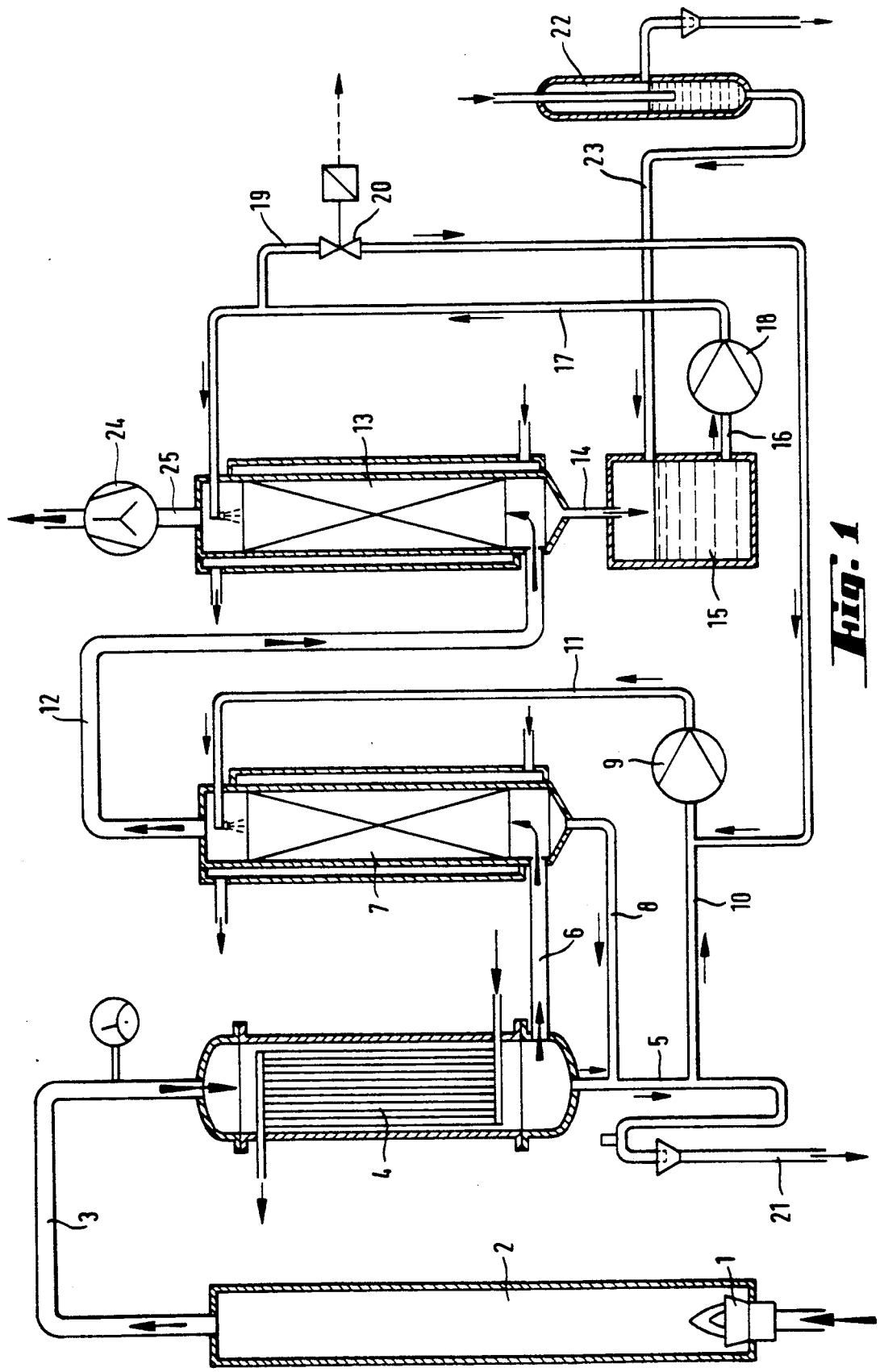
FIG. 1 shows an embodiment of burners suitable for the process according to the invention on a laboratory scale.

The process according to the invention is preferably carried out in equipment such as is shown diagrammatically in FIG. 1. However, other arrangements are also conceivable and possible for the absorption part. The crude gas which is to be reprocessed is passed, with addition of a fuel gas, through the burner (1) into the combustion chamber (2) and burned therein. The hot waste gas flows through line (3) into the condenser (4), where a part of the hydrogen chloride condenses as hydrochloric acid and flows off through line (5). The cooled gas mixture is transferred through line (6) into the scrubber (7). In the latter, a part of the hydrogen chloride is removed by circulated hydrochloric acid which flows off through line (8) to line (5). A part of the hydrochloric acid flowing off here is drawn by the pump (9) through line (10) and delivered through line (11) into the scrubber (7). The gas flows on through line (12) into the scrubber (13) where it is freed of hydrogen chloride by circulated dilute hydrochloric acid. The hydrochloric acid flows from the scrubber (13) through line (14) into the receiver (15) and from there through lines (16) and (17) and pump (18) back into the scrubber (13). Line (19) branches off from line (17) and leads via a solenoid valve (20) to line (10). By means of this solenoid valve (20), such a rate of scrubbing fluid is always fed from the second into the first scrubbing circulation that a hydrochloric acid of constant concentration flows off at the acid outlet (21). Via a stock tank (22) with level control, the receiver (15) is replenished via line (23) with the same rate of fresh water. The residual gas freed of hydrogen chloride is extracted by the exhaustor (24) via line (25) in such a way that a slightly reduced pressure prevails in the equipment, and is discharged into the open.

The burner according to FIG. 2 is composed of an inner tube (31) and an outer tube (32) which are fixed concentrically in a plug (33). The plug (33) is inserted into a wide tube (34). A further tube (35) is fixed at an angle in the plug (33) and is connected to the interspace between the tube (31) and tube (32). This burner is preferred for the use of hydrogen as the flammable gas. The hydrogen is fed through the tube (35) to the burner, and the crude gas and oxygen are fed through the tube (31).

For the use of propane as the flammable gas, a burner as in FIG. 3 is preferred, in which there is no lateral tube and crude gas, propane and oxygen flow in together through the inner tube. The inner tube (41) and the outer tube (42) are concentrically fixed in the plug (43) which is surrounded by a tube (44). Propane and crude gas flow into the tube (41) through the tube (45), and oxygen through the tube (46).

The advantageous mode of action of the process on the acid and waste gas quality was not deducible from the existing state of the art.

In fact, it is possible with the process according to the invention, surprisingly, to convert even major quantities of chlorinated hydrocarbons, contained in the crude gas, into carbon oxides and hydrogen chloride, without formation of soot being observable. The hydrochloric acid obtained from the flue gases is clear like water and then still contains organic chlorine compounds adsorbable on activated carbon only in a trace range of less than 1 mg/dm$^3$.

In addition, it is free of elemental chlorine and therefore does not require any further treatment. The waste gases obtained after the absorption of the hydrogen chloride are likewise chlorine-free and, like the hydrochloric acid, still contain only traces of organic compounds. They can be discharged to the atmosphere without further purification steps. No scrubbing waters or other production effluents arise, which would require disposal.

Apart from these advantages, contamination of the hydrochloric acid and of the waste gas by organic substances, which might theoretically only be formed in the thermal treatment, are not to be feared in the preferred temperature range.

DETAILED DESCRIPTION OF THE INVENTION

The procedure and the mode of action of the process will be explained below by reference to examples.

All $m^3$ data relate to the standard state (273 K, 1013 hPa).

EXAMPLE 1

In a laboratory apparatus according to FIG. 1, in which the burner (1) was essentially composed of two small ceramic tubes slid into one another, according to FIG. 2, and the combustion chamber 2 was formed by a quartz tube of 45 mm internal diameter and 650 mm length, 0.2 $m^3$/hour of crude gas of the following composition was thermally treated:

| | |
|---|---|
| HCl | 80.1% by volume |
| $Cl_2$ | 10.2% by volume |
| $N_2$ | 9.6% by volume |
| methyl chloride | 1.0 g/$m^3$ |
| ethyl choride | 1.3 g/$m^3$ |
| trichloromethane + trichloroethene | 1.6 g/$m^3$ |
| tetrachloromethane | 1.1 g/$m^3$ |
| n-paraffins $C_{10}/C_{13}$ | 0.2 g/$m^3$ |

0.13 $m^3$/hour of oxygen was admixed to the crude gas. The gas mixture was passed through the inner small ceramic tube. 0.36 m/hour of hydrogen was passed through the annular gap between the two small ceramic tubes. The flame temperature was 1210° C. and was measured by means of a reference body of ceramic material, using a radiation pyrometer.

The gas was cooled in the condenser (4), which was an Allihn condenser according to DIN 12,581 of 400 mm length, and freed of hydrogen chloride in the scrubbers (7) and (13). The scrubbers were double-walled glass tubes of 50 mm internal diameter and 460 mm length. The interior was packed with Rashig rings of 10×10 mm size. The jacket was supplied with cooling water.

About 90 $dm^3$/hour of scrubbing liquid was circulated in each of the scrubbers by means of pumps (9) and (18). The fresh water required for producing the hydrochloric acid was fed into the apparatus via the receiver (15) which had a capacity of 1 $dm^3$ and the level of which was kept constant at 80% by means of the overflow (22). Such a rate of scrubbing liquid was fed from the second into the first scrubbing circulation via a solenoid valve (20) controlled by a pulse/pause relay that the hydrochloric acid flowing out at the acid outlet (21) had a concentration of about 30% by mass of HCl.

By means of the exhaustor (24) such a reduced pressure was set in the apparatus that a manometer on line (3) indicated a draught of about 3 mbar.

In this way, it was possible to obtain hydrochloric acid with 30.2% by mass of HCl and an AOX content of <1 mg/$dm^3$.

Free chlorine was not detectable in the hydrochloric acid. In the residual gas after the absorption, neither free chlorine nor residues of the organic compounds originally present in the crude gas were detectable.

EXAMPLE 2

The hydrogen content of the moist waste gas from Example 1 was about 15% by volume. In order to test whether lower hydrogen contents in the waste gas lead to chlorine breakthroughs, a crude gas mixture of the following composition was thermally treated:

| Substance | % by volume |
|---|---|
| HCl | 33.8 |
| $Cl_2$ | 4.3 |
| $N_2$ | 4.0 |
| $H_2$ | 41.4 |
| $O_2$ | 16.4 |

By calculation, this gives a waste gas of the following composition:

| Substance | % by volume |
|---|---|
| HCl | 50.7 |
| $H_2O$ | 39.3 |
| $N_2$ | 4.8 |
| $H_2$ | 5.2 |

In the hydrochloric acid produced, which had a concentration of 32.4% by mass of HCl, free chlorine was again not detectable, even though the hydrogen content in the moist flue gas had only been about 5% by volume.

EXAMPLE 3

In the laboratory apparatus described in Example 1, 0.2 $m^3$/hour of crude gas of the following composition was thermally treated, using a burner according to FIG. 3:

| | |
|---|---|
| HCl | 77.9% by volume |
| $Cl_2$ | 9.2% by volume |
| $N_2$ | 12.2% by volume |
| methyl chloride | 0.6 g/$m^3$ |
| ethyl choride | 3.7 g/$m^3$ |
| trichloromethane + trichloroethene | 16.0 g/$m^3$ |
| tetrachloromethane | 11.0 g/$m^3$ |
| n-paraffins $C_{10}/C_{13}$ | 5.6 g/$m^3$ |

0.036 $m^3$/hour of propane and 0.126 $m^3$/hour of oxygen were used as the fuel gas.

The temperature was about 1250° C. The flame burned without forming soot.

The hydrochloric acid obtained had a concentration of 30.1% by mass of HCl. It was water-clear and contained no free chlorine. The AOX content was less than 1 mg/$d^3$.

In the waste gas after absorption, only traces of organic compounds (<5 mg/$m^3$) were still detectable.

EXAMPLE 4

In order to test whether possibly organic pollutants are even formed during the less than stoichiometric combustion of propane in the preferred temperature range, propane was burned at about 1250° C. at an oxygen deficit in a device resembling the apparatus according to Example 1.

The conditions were chosen such that the propane/oxygen molar ratio was 1:4.6 (stoichiometric ratio 1:5). The flame burned with a blue transparent color and without forming soot.

The water formed in the combustion was precipitated as far as possible from the hot flue gases by indirect cooling with cooling water of about 20° C. and collected as condensate.

Organic compounds up to a boiling range of about 150° C. were not detectable in the condensate by gas chromatography.

Aldehydes and ketones were not detectable in the flue gas itself, as obtained after the condensation. Other possible reaction products—such as, for example, acids—were also not detectable.

We claim:

1. A process for producing essentially chlorine-free hydrochloric acid, containing less than 1 mg per $dm^3$ of organic halogen compounds absorbable on activated carbon, from a crude gas containing hydrogen chloride and chlorine and optionally an organic compounds, said process comprising:

combining a said crude gas with a fuel gas the molecules of which contain hydrogen atoms and optionally carbon atoms, thereby obtaining a flammable gas mixture, and combining the flammable gas mixture with air or oxygen, the amount of oxygen being deficient with respect to the stiochiometric amount needed to burn all the carbon and hydrogen atoms in the fuel gas, heating the flammable gas mixture and the air or oxygen in a combustion zone to a temperature of 800° to 1600° C. by contact with a supporting flame, thereby forming a waste gas, the amount of fuel gas in the flammable gas mixture being sufficient and the air or oxygen deficit being controlled such that said heating to 800° to 1600° C. can take place and yet the waste gas still contains unburned hydrogen, and recovering essentially chlorine-free hydrochloric acid from said waste gas, said chlorine-free hydrochloric acid containing less than 1 $mg/dm^3$ of organic halogen compounds absorbable on activated carbon.

2. The process according to claim 1, wherein said temperature is in the range of 1000° C. to 1400° C.

3. The process as claimed in claim 1, wherein hydrogen chloride in the waste gas is absorbed in water, and the residual gas remaining after said absorption is discharged to the atmosphere without purification.

4. The process as claimed in claim 1, wherein the fuel gas contains methane, ethane, or propane, and a stiochiometric deficit of oxygen relative to the methane, ethane, or propane is maintained during said combining and heating steps.

5. The process as claimed in claim 1 wherein said fuel gas contains hydrogen and methane, ethane, or propane.

6. The process as claimed in claim 1, wherein the crude gas, in addition to hydrogen chloride and chlorine, contains nitrogen and a chlorinated hydrocarbon, a hydrocarbon, or combinations thereof.

7. The process as claimed in claim 1, wherein the excess hydrogen remaining in said waste gas is about 1 to 15% by volume of the waste gas.

8. The process as claimed in claim 1, wherein the air or oxygen deficit is controlled such that no soot is formed in the combustion zone.

9. The process as claimed in claim 2, wherein the air or oxygen deficit is controlled such that no soot is formed in the combustion zone.

* * * * *